US008139066B2

(12) United States Patent
Matskewich et al.

(10) Patent No.: US 8,139,066 B2
(45) Date of Patent: *Mar. 20, 2012

(54) ERROR METRICS FOR CHARACTERS

(75) Inventors: Tanya Matskewich, Kirkland, WA (US); Geraldine Wade, Redmond, WA (US); Gregory C. Hitchcock, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/984,846

(22) Filed: Jan. 5, 2011

(65) Prior Publication Data

US 2011/0096086 A1   Apr. 28, 2011

Related U.S. Application Data

(63) Continuation of application No. 11/768,835, filed on Jun. 26, 2007, now Pat. No. 7,872,651.

(51) Int. Cl.
*G06T 11/00* (2006.01)
*G06K 9/00* (2006.01)

(52) U.S. Cl. ......... 345/467; 345/616; 382/251; 382/252

(58) Field of Classification Search .................. 345/467; 382/251, 252, 299
See application file for complete search history.

(56) References Cited

U.S. PATENT DOCUMENTS

| | | | |
|---|---|---|---|
| 4,851,825 A | 7/1989 | Naiman | |
| 5,589,898 A * | 12/1996 | Atkinson | 351/237 |
| 5,818,970 A | 10/1998 | Ishikawa | |
| 5,883,979 A | 3/1999 | Beretta | |
| 5,910,805 A | 6/1999 | Hickey | |
| 5,943,063 A | 8/1999 | Dowling | |
| 6,005,588 A | 12/1999 | Guha | |
| 6,160,576 A * | 12/2000 | Higuchi et al. | 348/62 |
| 6,282,327 B1 | 8/2001 | Betrisey | |
| 6,309,117 B1 * | 10/2001 | Bunce et al. | 400/61 |
| 6,362,830 B1 * | 3/2002 | Walraven | 345/600 |
| 6,563,502 B1 | 5/2003 | Dowling | |
| 6,591,008 B1 * | 7/2003 | Surve et al. | 382/162 |
| 6,624,828 B1 * | 9/2003 | Dresevic et al. | 715/771 |
| 6,714,963 B1 * | 3/2004 | Levine et al. | 709/203 |
| 6,931,151 B2 * | 8/2005 | Weast | 382/162 |
| 6,992,671 B1 | 1/2006 | Corona | |
| 7,272,785 B2 * | 9/2007 | Fukuda et al. | 715/234 |

(Continued)

OTHER PUBLICATIONS

U.S. Appl. No. 11/768,835, Mail Date Jun. 11, 2010, Office Action.

(Continued)

*Primary Examiner* — M Good Johnson
(74) *Attorney, Agent, or Firm* — Workman Nydegger

(57) ABSTRACT

Generating an error from an error metric quantifying differences between reference objects representing characters and representations of the reference objects. One embodiment includes a method which includes accessing a reference object representing a character. One or more reference object characteristics are quantified. The reference object characteristics are related to character structural and color information of at least a portion of the reference object to generate a reference object metric. A representation object of the reference object is accessed. One or more representation object characteristics are quantified to create a representation object metric. The representation object characteristics are related to character structural and color information of a portion of the representation object of the reference object corresponding to the portion of the reference object. An error is calculated based on a difference between the reference object metric and the representation object metric. The error is output to a user.

20 Claims, 4 Drawing Sheets

U.S. PATENT DOCUMENTS

| | | |
|---|---|---|
| 7,425,960 B2 | 9/2008 | Dowling |
| 7,619,627 B2 | 11/2009 | Washio |
| 2004/0136570 A1* | 7/2004 | Ullman et al. ................ 382/114 |
| 2004/0189643 A1 | 9/2004 | Frisken |
| 2005/0195437 A1 | 9/2005 | Couwenhoven |
| 2007/0211063 A1 | 9/2007 | Sawazaki |

OTHER PUBLICATIONS

U.S. Appl. No. 11/768,835, Mail Date Sep. 30, 2010, Notice of Allowance.

* cited by examiner

ERROR METRICS FOR CHARACTERS

CROSS-REFERENCE TO RELATED APPLICATIONS

This application is a continuation of prior application Ser. No. 11/768,835 filed Jun. 26, 2007, entitled "ERROR METRICS FOR CHARACTERS", which is incorporated herein by reference in its entirety.

BACKGROUND

Computers and computing systems have affected nearly every aspect of modern living. Computers are generally involved in work, recreation, healthcare, transportation, entertainment, household management, etc.

Computers generally include hardware which allows the computer to output visual representations of data to a user. For example, computers may include a video card connected to a CRT monitor or LCD video screen which allows visual representations of objects including characters or other graphics to be displayed to the user. Similarly, many computers include the ability to interface with printers to provide visual representations of objects on a hard copy for a user.

Depending on the nature of the visual representations and the medium used to convey the visual representations to the users, the visual representations output to a user may vary from an ideal output. For example, LCD video screens are typically only able to output data using a pixel resolution of about 110-120 pixels per inch. Outputting a visual representation of a character may result in the character including aliasing due to the size and resolution limitations of a screen.

To correct less than ideal representations, filters may be applied to an object. For character objects, filters are applied to the entire object. Thus, in the example above, an antialiasing filter such as gray scaling may be applied to an entire character to help soften the effects of the aliasing.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment described herein is directed to a method including acts for generating an error from an error metric quantifying differences between reference objects representing characters and representations of the reference objects. The method includes accessing a reference object representing a character. One or more reference object characteristics are quantified. The reference object characteristics are related to character structural and color information of at least a portion of the reference object to generate a reference object metric. A representation object of the reference object is accessed. One or more representation object characteristics are quantified to create a representation object metric. The representation object characteristics are related to character structural and color information of a portion of the representation object of the reference object corresponding to the portion of the reference object. An error is calculated based on a difference between the reference object metric and the representation object metric. The error is output to a user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments herein may comprise a special purpose or general-purpose computer including various computer hardware, as discussed in greater detail below.

Often an object such as a character that is output to a user varies from an idealized character. For example, a character that is displayed to a screen which only has a whole pixel resolution of 100-120 dots per inch may vary in various ways from an idealized representation of the character, such as a high resolution version of the character or a drawing of the character. Embodiments describe herein include functionality for quantifying the differences between a reference object of a character and a representation of the reference object. This may be accomplished by quantifying various characteristics of various features of the reference object and quantifying various characteristics of various features of the representation of the reference object and calculating a difference based on the quantities. Characters may include, for example, writing symbols in various languages, icon symbols, ASCII symbols, line drawing elements, etc.

Figure 1:
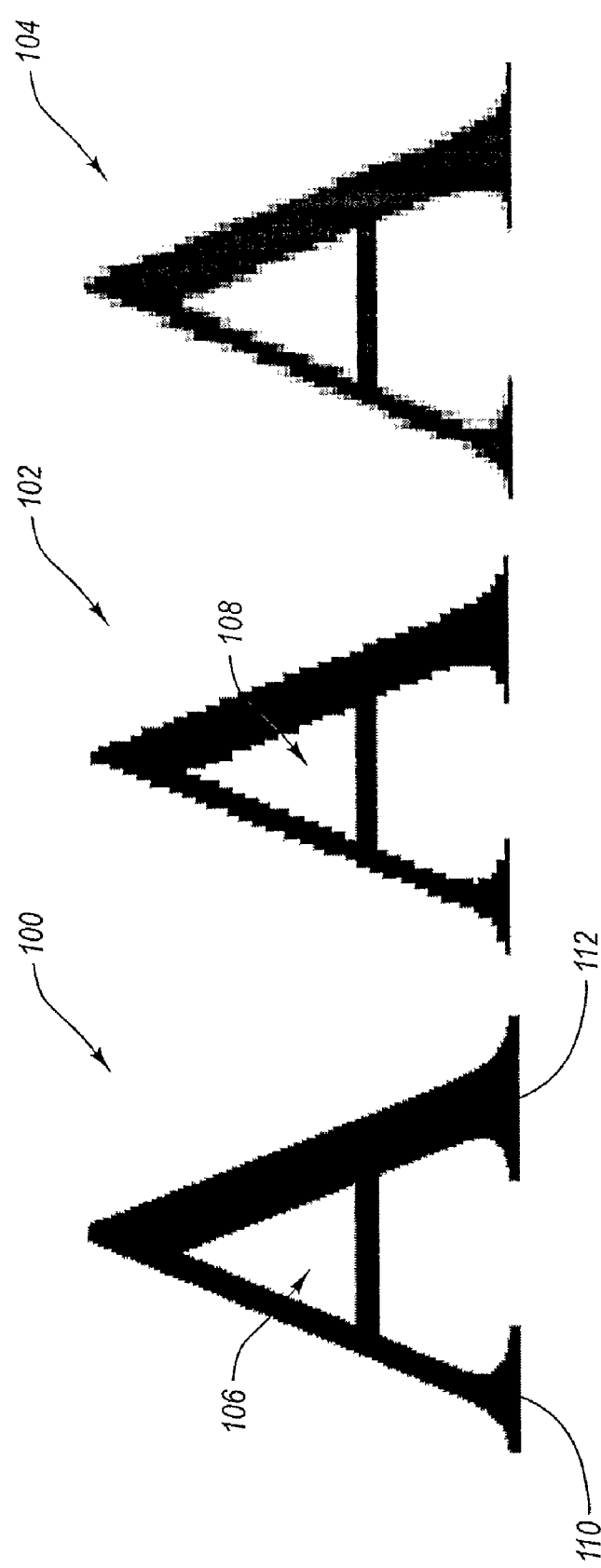
FIG. 1 illustrates a reference object, a representation of the reference object, and a second representation of the reference object.

Referring now to FIG. 1, an example of one embodiment is demonstrated. FIG. 1 illustrates a reference object 100. In this example, the reference object 100 is a high resolution character object. Notably, the reference object may be any suitable object such as a high resolution rendition of the character, an outline representation of a character, a drawing on paper, or any other suitable reference object including a lower quality object.

FIG. 1 further illustrates two representations 102 and 104 of the reference object 100. The representation 102 in this example has noticeable aliasing. Aliasing typically occurs because a visual output is limited to discrete units of display. For example, a computer LCD screen is typically limited to 100-120 whole pixels per inch. Thus, when characters are rendered using whole pixels, the number of pixels available with respect to the size of the character may result in whole pixel boundaries causing the jagged edges characteristic of aliasing.

In one embodiment, the representation 102 may be compared to the reference object 100. This may be accomplished by using an error metric, where one or more characteristics of the reference object 100 are compared to one or more characteristics of the representation 102. An error, or difference between the two, is calculated based on the comparison. The characteristics of the reference object and the representation of the reference object may be quantified to a reference object metric and a representation object metric respectively which may be used in the calculation of the error.

Notably, when calculating an error using an error metric, the error metric will typically take into account both a characteristic being measured, and spaces in which the characteristic is measured. Characteristics may be thought of informally as "what" and may include "where" measurements are being made. Spaces define "how" to quantify the measurement Quantities may be calculated for several characteristics as will be discussed in more detail below. Examples of characteristics include, for purposes of example here, luminosity, and contrast. These characteristics could be measured with respect to a variety of different features, including typographical & geometrical entities and characteristics. One example of a mathematical definition of contrast includes a $1^{st}$ order derivative of a characteristic for which the contrast is measured.

A variety of spaces exist in which an error can be calculated. For example, in one embodiment, a metric can be measured based on such spaces as CIE-defined standard spaces (CIELAB, S-CIELAB) or their components, space of spectral power distributions, space of human cone responses or in some consequent spaces for example such as space of $1^{st}$ (or any) order derivatives.

Comparisons may be performed based on the common characteristics of characters as compared to general objects. For example, characters, including text bodies, tend to have higher spatial frequencies than general objects. Additionally, characters typically have very high contrast. For example, characters used in text settings are generally black and white. Because of this, characters typically should be rendered such that perceived contrast of different components of a character closely resembles those of the reference object. As such, a comparison of the reference object's perceived contrast or perceived colorfulness can be compared to the perceived contrast or perceived colorfulness of the representation 102.

Characters and fonts themselves have other common characteristics that are generally less relevant to general objects. For example, it is generally desirable that characters have open counter spaces, such as the counter space 106 in FIG. 1. Additionally, it is generally desirable that strokes should be consistent. For example, strokes should be rendered without visual interruptions. Additionally, strokes should have consistent widths on stems or other features. Further still, characters should have regularity across the character. For example, the letter "m" should be rendered such that each of the three stems is consistent with one another. Further, it is desirable that characters be rendered such that strokes do not collide with one another.

Thus, comparisons between the reference object 100 and the representation 102 may be made based on the expected common characteristics when the object is a character. A difference between a reference object 100 and a representation 102 can be calculated based on the characteristics to calculate an error. This error can then be used to define the difference between two objects. This may allow for optimizations to be applied to an object to improve the object or for determining if the representation 102 is within a specified parameter range.

Notably comparisons may be made based on a space including general characteristics of human or other organic species visual perception. Specifically, the physiology of, for example, human visual perception causes some types of differences between the reference object 100 and the representation 102 to be more perceptible and contribute to more dissatisfaction with the rendering of an object. For example, different color of different hues may contribute differently to perceived colorfulness which usually is especially distracting.

Notably, some comparisons may be related to a space of human or other species visual perception for a specific group of individuals. For example, individuals with dichromatic vision may have different perception requirements from those who do not suffer from dichromatic vision. As such, some error metrics may be used where a specific user or class of users, and their physiological perception characteristics are taken into account in quantifying an error in an error metric calculation.

Several different error metrics may be applied singly or in combination with other error metrics. Further, error metrics may be weighted such that some characteristic errors are weighted as being more important than other errors. Error metrics also can be "conditionally weighted." That is, error metrics may have their relative importance prioritized based on some local characteristic of an object. For example, the presence or absence of a structural feature of a character may affect the weight of an error metric. Error metrics are implemented to achieve a reasonable evaluation of the difference, or a characteristic of a difference, between the rendition of the representation 102 of the reference object 100 and the reference object 100.

Illustrating now additional examples, as noted previously, one error metric relates to perceived contrast. For example, it is often desirable that text be perceived as a high contrast black and white object. Thus, the reference object 100, or portions of the reference object 100, may be evaluated for perceived contrast. The perceived contrast of the reference object 100 may be assigned some reference object metric. Similarly, the representation 102 of the reference object may be evaluated for perceived contrast. The perceived colorfulness of the representation 102 of the reference object is also assigned a representation object metric. The error is then calculated by evaluating at least the difference between the reference object metric for the perceived contrast of the reference object 100 and the representation object metric for the perceived contrast of the representation 102. Metrics for reference objects and corresponding representations for perceived contrast might include, in one example, information about all intensities of all primaries for all pixels. Notably, errors are not necessarily calculated by just subtracting two numbers, which quantify a reference object and its representation respectively, but rather by considering an entire set of data represented by the metrics for the reference object and its corresponding representation. In addition, perceived contrast of the different features of objects may be evaluated. For example, perceived contrast of a specific typographical component, such as stroke, with respect to a background or to another component may be evaluated. In one embodiment, a metric for contrast may be mathematically approximated using a $1^{st}$ order derivative in an appropriate space.

Therefore an error metric calculating deviation between perceived contrast of different components, with respect to background or to other components, in a reference object and its representation can be defined. For measuring, comparing and/or optimizing definite characteristics of an object, certain information is associated with the object. For example, an object typically includes information regarding the immediate surroundings of the object. Further, additional information commonly used in science of visual perception, such as information related to a wider surrounding, viewing conditions, and characteristics of an output device, is generally required and assumed to be known as a function of being associated with an object. This information may influence a measured characteristic and therefore an outcome of an error measurement. Therefore an error metric can be derived or calculated that is optimized for higher contrast or increased spatial intensities.

Figure 2A:
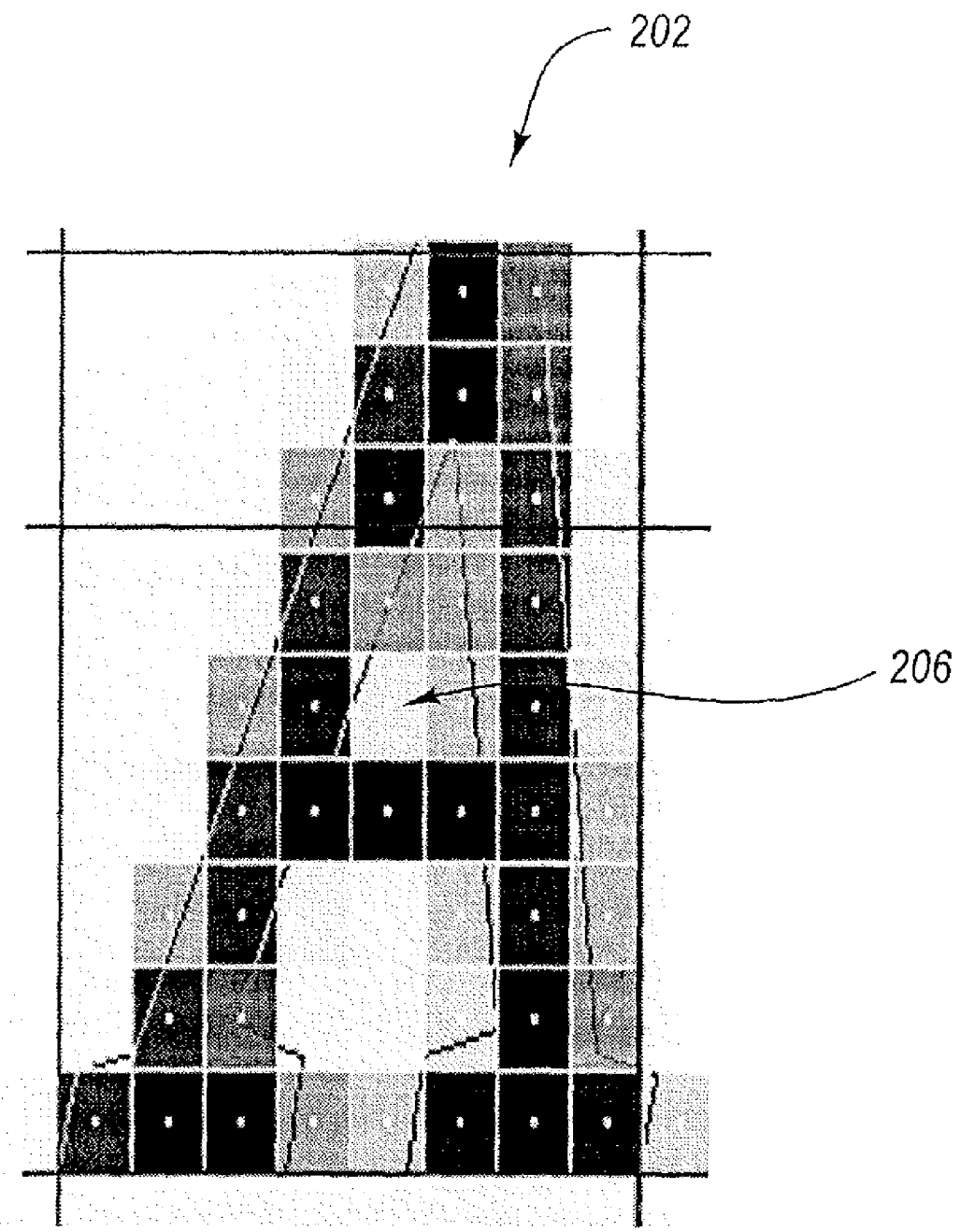
FIG. 2A illustrates a representation of a reference object using gray scaling.

Error metrics may be implemented for typographic characteristics. In particular, error metrics may be applied based on structural information including typographical entities such as strokes, serifs, counter spaces, etc; geometrical entities and characteristics such as boundaries, connected components, skeletons, orientations, etc; and relations between entities such as distance and relative orientation. Further, error metrics may be based on color information, including information related to foreground and background. Some typographic characteristics which may be evaluated include openness of counter-spaces, stroke collisions, stroke continuity, stroke regularity, stroke consistency in rendering, and the like. Illustrating now an error calculated based on the openness of the counter space 108 and the openness of the counter space 106, FIG. 2A illustrates a representation 202 where gray scaling has resulted in the counter space 206 appearing more closed. In one embodiment, a measure of the counter space, such as for example by calculating cumulative luminosity over an idealized region of the counter-space or measuring extends of a counter space by indicating a region with luminosity higher than a threshold value, may be used along with a measure of a reference object counter space measuring cumulative luminosity over an idealized region of the counter-space or measuring extends of a counter space by indicating a region with luminosity higher than a threshold value of the reference object counter space to calculate an error of an error metric.

Figure 2B:
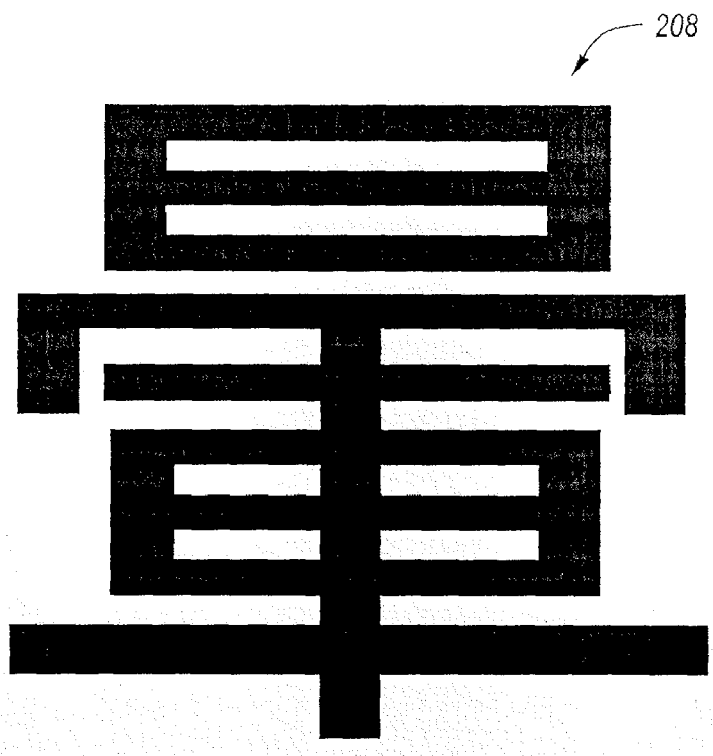
FIG. 2B illustrates a high resolution bitmap of a character.
Figure 2C:
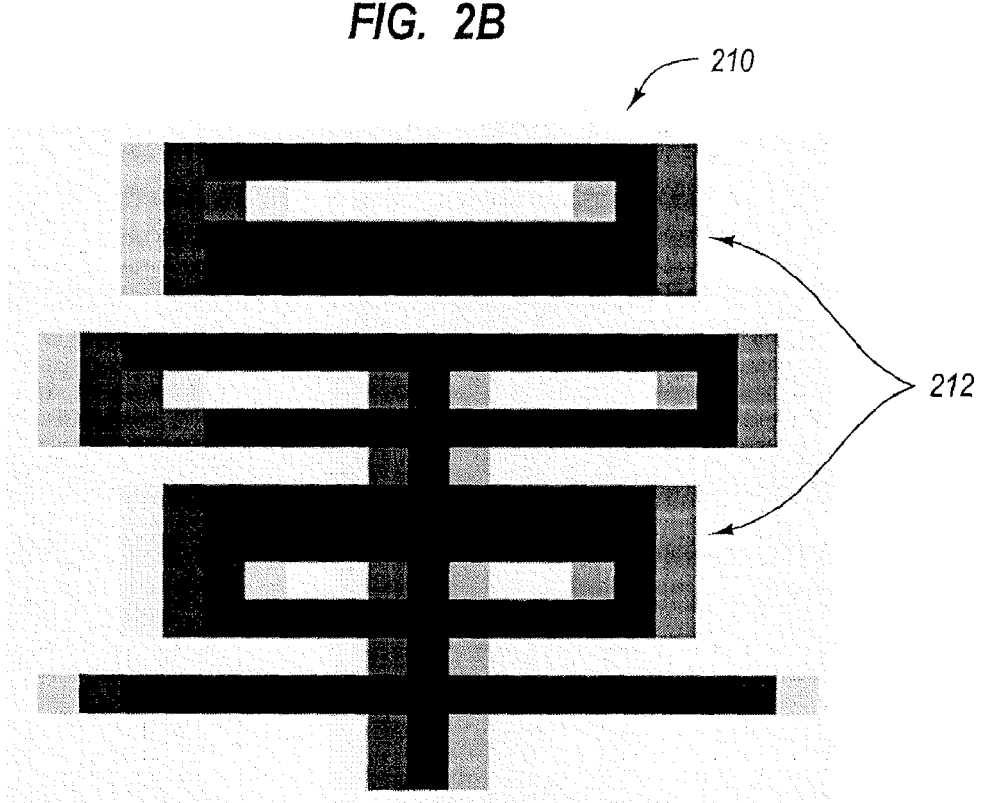
FIG. 2C illustrates a lower resolution bitmap of the character in FIG. 2B.

Another error metric that may be used relates to perception of collision of strokes. Strokes may appear to collide when represented as parallel or nearly parallel. For example, FIGS. 2B and 2C illustrate the effects of stroke collisions. FIG. 2B illustrates a high resolution bitmap of a character 208. FIG. 2C illustrates a representation 210 of the character 208, where the representation is a lower resolution bitmap of the character 208. As illustrated at 212, stroke collisions result because of the limitations due to the low resolution at which the representation 210 is presented. A metric may be implemented which defines the perception of collision of strokes of a reference object as compared to the perception of collision of strokes of a representation of the reference object. Similarly, error metrics may be used to characterize the regularity of a stroke, or consistency of a stroke rendering. For example, the consistency of strokes in a reference object may be compared with the consistency of strokes in a representation of the reference object. Illustratively, it is desirable that for the letter "m" each of the three stems should be similar in width. Thus the consistency of widths of stems in the reference object may be compared with the consistency of width of stems in the representation.

Notably, a number the error metrics described herein may be specifically directed to the space of physiological characteristics of human or other species perception including, for example, characteristics of visual perception, characteristics of cognitive processes, or characteristics of recognition specific for a class of objects being evaluated. Thus, when an error metric is used, the error metric may include elements which take into account the physiological characteristics of a single human or other species user, a group of human or other species users, or human or other species perception in general. For example, a single human user may use various wizards or other interfaces to allow a system to determine the user's unique physiological characteristics. These characteristics could be quantified and used as operands in an error metric calculation. Similarly, known characteristics for a given group of users may be included as operands. For example, users with dichromatic vision, also known as colorblindness, have certain perception characteristics which can be described mathematically. These mathematical descriptions may be included as part of the error metric. Further, certain perception characteristics are common to major portions of the population. These perception characteristics can be described mathematically and included in error metric usage.

Another error metric that may be used relates to local similarities. For example, a point by point comparison of a local portion of the representation could be made to a corresponding local portion of a reference object. Notably, in some embodiments, when a local similarity error metric is used with other error metrics, the local similarity error metric may be given a lower error weight when compared to other error metrics when the other error metrics are deemed to have higher importance. For example, a geometric distortion, such as a slight shift in a feature, may be beneficial to achieve higher contrast, or some other characteristic. Thus, if higher contrast is deemed to have more importance than local similarity, then the local similarity error metric may have low or no penalty weight.

When defining many error metrics, there may be a specification where spatially the characteristics are measured. One approach is by a point-by-point comparison meaning that the comparison is performed between some characteristics measured at exactly the same locations of the reference object and its representation.

However while defining error metrics specific for characters, it might be beneficial to use a more 'relaxed' approach allowing for some characteristic of a representation to become similar to the characteristic of a reference object within some tolerance of a location where it was measured for the reference object without being penalized. One embodiment of such approach will establish correspondence between locations where a characteristic is measured based on a rule depending on structural or other information. Another embodiment may compare variation of some characteristic along a path between pairs of established locations rather than values of a characteristic itself. This "more relaxed" approach may allow, for example, allowing a tradeoff between achieving a higher contrast of some structural elements, e.g. strokes and the like, and a spatial distortion with respect to the reference object.

Errors using error metrics may be calculated in a number of different ways. For example, in one embodiment, an error may be calculated by identifying one or more spaces for comparison where the objects or mappings in the spaces of representations of reference objects and corresponding reference objects are compared. One or more characteristics may be compared at each space. Characteristics at each space may be quantified into a metric, where the metrics are used in calculating the error. Notably, when multiple spaces and/or characteristics are quantified, an overall error metric may include weighting of different characteristics or characteristics at different spaces. Weighting allows for certain characteristics, or characteristics at certain spaces to be considered more important than others.

In another embodiment, an error may be calculated based on important entities and the related characteristics of the entities of an object being rendered. For example, white space, strokes, skeletons, edges, orientations, distances etc. may be identified on a reference object and a representation of the reference object. Comparisons can then be made of the characteristics for these identified entities. Additionally, when multiple entities or characteristics are evaluated, relative weights may be assigned to characteristics of the entities based on relative importance of the entities or characteristics of the entities.

Figure 3:
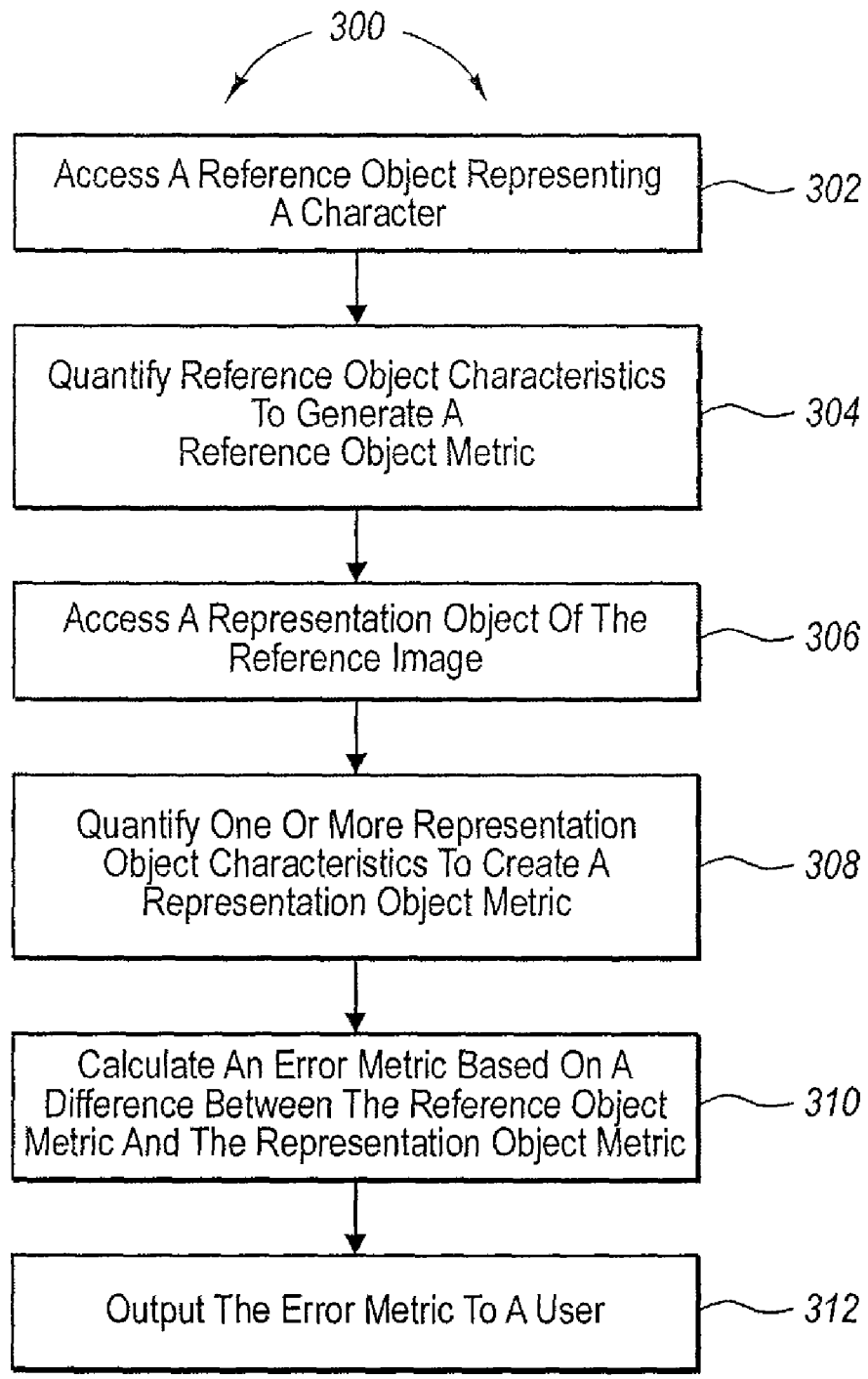
FIG. 3 illustrates a method of calculating an error.

Referring now to FIG. 3, an example of a method 300 is illustrated. The method 300 illustrates various acts for calculating an error using an error metric. The method 300 may be practiced, for example, in a computing system. The method 300 includes acts for generating an error quantifying differences between reference objects representing characters and representations of the reference objects. The method 300 includes accessing a reference object representing a character (act 302). As noted, the representation may be a high resolution rendition of the character, and outline representation of a character, a drawing on paper, or any other suitable reference object including a lower quality object.

The method 300 further illustrates quantifying one or more reference object characteristics related to character structural and color information of the reference object to generate a reference object metric (act 304). Notably, this may include quantifying characteristics of a portion of a character. For example, openness of a counter space may be quantified. Characteristics of character structure features including such as strokes, stems, crossbars, diagonals and serifs may be quantified. For example stroke characteristics may be quantified, including consistency of strokes within a character or across characters, continuity of strokes, and collisions of strokes. Other characteristics that may be quantified include perceived luminance, chrominance and their derivatives such as perceived brightness, colorfulness or contrast, sharpness of edges, or perceived shift of character features. Still other characteristics may be quantified within the scope of embodiments described herein.

Quantifying may include a number of different actions. For example, quantifying may include calculating pixel primaries, luminosity, CIELAB spaces, contrast, etc. Additionally, quantifying may include factors such as human or other species perception models.

Referring once again to FIG. 3, method 300 includes accessing a representation object of the reference object (act 306). The method 300 further includes quantifying one or more representation object characteristics related to character structural and color information of the representation object of the reference object to create a representation object metric (act 308). This may include quantifying characteristics of a portion of the representation object corresponding to a portion of the reference object. The method 300 further includes calculating an error based on a difference between the reference object metric and the representation object metric (act 310).

Method 300 further includes outputting the error to a user (act 312). Outputting the error to a user may be accomplished in a number of different ways. For example, an error may be displayed to a human user. Alternatively, a user may be another computer system or program within a computing system. Thus, the error may be output in a digital format consumable by digital systems. This allows for the error to be used in logging operations, automated error correction operations, etc.

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of generating and outputting an error quantifying differences between reference objects representing characters and representations of the reference objects, wherein the method includes:
   accessing a reference object representing a character;
   quantifying one or more reference object characteristics, the reference object characteristics being related to character structural or color information of at least a portion of the reference object to generate a reference object metric;
   accessing a representation object of the reference object;
   quantifying one or more representation object characteristics, the representation object characteristics being related to character structural or color information of a portion of the representation object of the reference object corresponding to the portion of the reference object to create a representation object metric;

determining and quantifying physiological characteristics of a user;

calculating an error based on a difference between the reference object metric and the representation object metric and which is calculated by at least considering the physiological characteristics of the user as operands within the error calculation; and outputting the calculated error.

2. The method of claim 1, wherein the error metric is calculated using mathematical descriptions that define perception characteristics associated with the physiological characteristics of the user.

3. The method of claim 2, wherein the physiological characteristics of the user comprise dichromatic vision and wherein the error metric is calculated using mathematical descriptions that define perception characteristics associated with colorblindness.

4. The method of claim 1, wherein the physiological characteristics of the user are obtained through a computing interface that determines the physiological characteristics of the user.

5. The method of claim 1, wherein the portion of the reference object includes character structural information including at least one of:

typographical entities including one or more of strokes, serifs, and counter spaces;

geometrical entities and characteristics including one or more of boundaries, connected components, skeletons, and orientations; or relations between entities including one or more of distance and relative orientation.

6. The method of claim 1, wherein the portion of the reference object includes a character counter space.

7. The method of claim 1, wherein the one or more reference object characteristics includes openness of the counter space.

8. The method of claim 1, wherein the reference object metric is calculated using a first or higher order derivative or approximation of a first or higher order derivative of a portion in an appropriate space of the reference object to determine contrast of the reference object in the portion.

9. The method of claim 1, wherein the reference object metric is calculated using a human or other organic species perception model, including at least one of characteristics of visual perception, characteristics of cognitive processes, or characteristics of recognition specific for a class of objects being evaluated.

10. The method of claim 9, wherein the reference object metric is calculated using at least one of local luminance or chrominance and their derivatives, including at least one of perceived contrast or perceived colorfulness, sharpness of edges, or perceived shift of character features based on different spaces.

11. The method of claim 1, wherein calculating an error is performed based representations of objects' edge pixels in relation to a background color.

12. The method of claim 1, wherein calculating an error based on a difference between the reference object metric and the representation object metric comprises allowing for at least one characteristic of the representation object to be similar to the characteristic of the reference object within a pre-specified tolerance of a location where the characteristic was measured for the reference object without being penalized.

13. The method of claim 1, wherein calculating an error based on a difference between the reference object metric and the representation object metric comprises comparing characteristics at locations established by a rule based on a structural information including information related to typographical features and entities.

14. A computer readable storage medium comprising stored computer executable instructions that when executed by a processor are configured to perform a method of generating an error from an error metric quantifying differences between reference objects representing characters and representations of the reference objects, the method comprising:

accessing a reference object representing a character;

quantifying one or more reference object characteristics, the reference object characteristics being related to character structural or color information of at least a portion of the reference object to generate a reference object metric;

accessing a representation object of the reference object;

quantifying one or more representation object characteristics, the representation object characteristics being related to character structural or color information of a portion of the representation object of the reference object corresponding to the portion of the reference object to create a representation object metric;

determining and quantifying physiological characteristics of a user;

calculating an error based on a difference between the reference object metric and the representation object metric and which is calculated by at least considering the physiological characteristics of the user as operands within the error calculation; and outputting the calculated error.

15. The computer readable storage medium of claim 14, wherein the computer readable storage medium comprises a computing system having system memory storing the computer executable instructions.

16. A method of generating an error quantifying differences between reference objects representing characters and representations of the reference objects, wherein the method includes:

accessing a reference object representing a character;

quantifying a plurality of different object characteristics, the reference object characteristics being related to different character structural or color information of the reference object;

assigning weights to the quantified object characteristics and generating a corresponding reference object metric from the weighted and quantified object characteristics;

accessing a representation object of the reference object;

quantifying a plurality of representation object characteristics, the representation object characteristics being related to character structural or color information of the representation object of the reference object;

assigning weights to the quantified object characteristics and generating a corresponding reference object metric from the weighted and quantified object characteristics;

calculating an error based on a difference between the reference object metric and the representation object metric; and outputting the calculated error.

17. The method of claim 16, wherein the method further includes:

determining and quantifying physiological characteristics of a user; and calculating the error by at least considering the physiological characteristics of the user as operands within the error calculation.

18. The method of claim 17, wherein the error metric is calculated using mathematical descriptions that define per ception characteristics associated with the physiological characteristics of the user.

19. The method of claim 18, wherein the physiological characteristics of the user comprise dichromatic vision and wherein the error metric is calculated using mathematical descriptions that define perception characteristics associated with colorblindness.

20. The method of claim 19, wherein the physiological characteristics of the user are obtained through a computing interface that determines the physiological characteristics of the user.

* * * * *